United States Patent [19]
Braun et al.

[11] 3,788,458
[45] Jan. 29, 1974

[54] CONVEYOR TROUGH CONNECTING JOINT CONSTRUCTION

[75] Inventors: Gert Braun; Ernst Braun, both of Essen-Heisingen, Germany

[73] Assignee: Halbach & Braun, Wuppertal-Barmen, Germany

[22] Filed: Jan. 12, 1973

[21] Appl. No.: 323,049

[30] Foreign Application Priority Data
Jan. 19, 1972 Germany............... P 22 02 399.0

[52] U.S. Cl............... 198/204, 193/35 J, 198/108
[51] Int. Cl..................... B65g 17/06, B65g 19/18
[58] Field of Search...... 198/204, 206; 52/579, 698; 287/189.36 D; 59/85, 93; 193/14, 35 J

[56] References Cited
UNITED STATES PATENTS
3,680,682  8/1972  Paul.................................. 198/204
FOREIGN PATENTS OR APPLICATIONS
831,217  2/1952  Germany........................... 198/204
1,049,778  12/1957  Germany........................... 198/204

*Primary Examiner*—Evon C. Blunk
*Assistant Examiner*—Jeffrey V. Nase
*Attorney, Agent, or Firm*—John J. McGlew et al.

[57] ABSTRACT

A conveyor trough connecting joint comprises two conveyor sections arranged in end-to-end abutting relationship and which have walls, such as the side walls, which carry joining means in the form of a pair of spaced apart tenons carried by each section, and with the corresponding tenons of one section being aligned and opposed to corresponding tenons of the other section. The sections are held together by a connecting plate having double eye openings and which is arranged to embrace the tenons of adjacent trough sections with the opposed tenons of adjacent sections being positioned in respective ones of the eye openings. Both sets of tenons are surrounded by an upper and lower web portion of the connecting plate and the plate includes a central web which extends between the eye openings and embraces the opposed pairs of tenons from the interior.

4 Claims, 3 Drawing Figures

CONVEYOR TROUGH CONNECTING JOINT CONSTRUCTION

BACKGROUND OF THE INVENTION

1. Field of the Invention

This invention relates in general to the construction of conveyor troughs and, in particular, to a new and useful connecting joint for trough sections of conveyor troughs for chain scraper conveyors, particularly for joining the adapter trough or machine frame and the connecting trough by joining means which is connected to the trough sections in the abutting range of the sections of the trough.

2. Description of the Prior Art

Trough sections are usually joined together by screw bolt joints which permit a certain play between the trough sections. Such screw bolt joints are suitable only to a limited extent for absorbing bending stresses which necessarily occur during the advance of the conveyor trough due to the play between the trough sections because considerable forces act in great intervals on the conveyor trough during its advance so that the trough sections advance frequently at different rates and bend off horizontally. This results in the tearing off of the screw-bolt joints or the deformation of such joints. After the trough has advanced, a majority of the screw bolts must therefore be replaced or repaired. This requires a considerable down time of the conveyor trough and a considerable expense. This is particularly true for the abutting region between the adapter trough or machine frame and the connecting trough because at such locations extremely high stresses appear due to the occurrence of vertical forces caused by vertical bending of the adapter trough which are superimposed on horizontal forces caused by the advancing forces. This leads to the simultaneous appearance of bending stresses and thus tensile and compressive stresses. The bending of the adapter trough results from its arrangement in the range of the transition from the face to the road and from the extreme load which is produced by the connected machine frame which carries the driving and transmission units for the planes and conveyor means.

The connecting trough, however, adjoins the trough arranged in the face. At any rate, the screw bolt joints frequently break off for the reasons mentioned above, particularly in the abutting range between the adapter trough and the connecting trough; or they are not replaced due to negligence or inconvenience which arises because the driving and transmission units on the machine frame, which overhang the abutting range between the adapter trough and the connection trough, must be partly disassembled for this purpose.

SUMMARY OF THE INVENTION

The present invention provides a trough joint with adjoining means designed as pairs of tenons which are associated with the respective trough sections and the joint includes a connecting plate with a double eye which embraces respective opposed pairs of the tenons of adjacent trough sections. The plate includes an upper and lower web which engages against the top and bottom side surfaces of the tenons and and intermediate or central web engages the respective opposite surfaces of the pairs of opposed tenons which are carried on adjacent trough sections. With such an arrangement, a double connection is established. Since the connecting plate has a double eye and the two upper tenons engage within the top eye opening and are separated by a central web from the two lower tenons which engage in the bottom eye opening, substantially only the upper web and the central web are stressed for tension when adjacent trough sections are bent off. In such instances, the connecting plate forms a saddle engagement which, when the adjacent trough sections are bent off and form a depression, will result in the stressing only of the lower web and the central web of the plate. The tensile stresses are distributed substantially by halves over the connecting plate depending on whether the plate is stresses at the top or the bottom. The trough point, according to the invention, is used preferably for joining adapter trough and connecting trough but it is also suitable as a conventional trough section joint, particularly for larger trough dimensions.

With the invention, the tenons are formed with a cross-section which taper both in the longitudinal and in the transverse direction toward the associated tenons of the adjacent trough section. This cross-sectional form prevents jamming of the attached connecting plate and the connecting plate can be attached on the pairs of tenons and be removed again.

As a general principle, it is possible to weld the pairs of tenons directly to the side walls of the trough sections. For reasons of assembly, however, the invention suggests that the pairs of tenons form a unit with the trough connecting part, and that the trough connecting parts be inserted into the trough side walls. The insertion of the trough connecting parts into the side walls of the trough presents no difficulties since the side walls are preferably designed as profile walls with recesses which are suitable to receive the trough connecting parts. In this case also, it is principally possible to weld the trough connecting plates to the side walls of the trough or to screw them thereon. A particularly simple assembly of the connecting plate is achieved when the trough connecting parts of adjacent trough sections have, in accordance with the preferred embodiment of the invention, a pocket to receive a tongue on the associated connecting plate and also a bore with an adjoining oblong slot to receive a fastening bolt, for example, a screw bolt, which passes through a corresponding bore in the connecting plate. With such a design of the trough connecting parts, it is possible to attach the connecting plate on the pairs of tenons by means of the fastening bolt or to remove the plate therefrom without disassembling the driving and transmission units or other machine parts in the abutting range between the adapter trough and the connecting trough. This is so because the connecting plate is only secured on ones side, namely on the connecting trough side, by means of a bolt, while on the opposite side of the adapter trough, the trough connecting part with its tongue is introduced only into an insert pocket.

The advantages of the invention are seen substantially in the fact that a trough joint for trough sections is provided particularly for the adapter trough or machine frame and the connecting trough, which is characterized by an extremely high load capacity and sealability, because it is a double joint. This double joint is capable of absorbing the tension components appearing due to the vertical bending and to the horizontal bending during the advance. At least two webs of the connecting plate are always used to absorb the vertical or horizontal forces. The result is a trough joint with a high load capacity.

Accordingly, it is an object of the invention to provide a trough joint for trough sections of conveyor troughs for chain scraper conveyors and particularly for joining the adapter trough or machine frame and the connecting trough, comprising two trough sections arranged in end-to-end abutment and joining means associated with the sections which includes a pair of spaced apart raised tenons carried by each section with corresponding tenons of one section being aligned and opposed to corresponding tenons of the other section, and including a connecting plate with double eye openings embracing the two pairs of tenons with the opposed tenons of adjacent sections being positioned in the respective ones of said eye openings.

A further object of the invention is to provide a trough joint which is simple in design, rugged in construction and economical to manufacture.

For an understanding of the principles of the invention, reference is made to the following description of a typical embodiment thereof as illustrated in the accompanying drawings.

GENERAL DESCRIPTION OF THE PREFERRED EMBODIMENT

Figure 1:
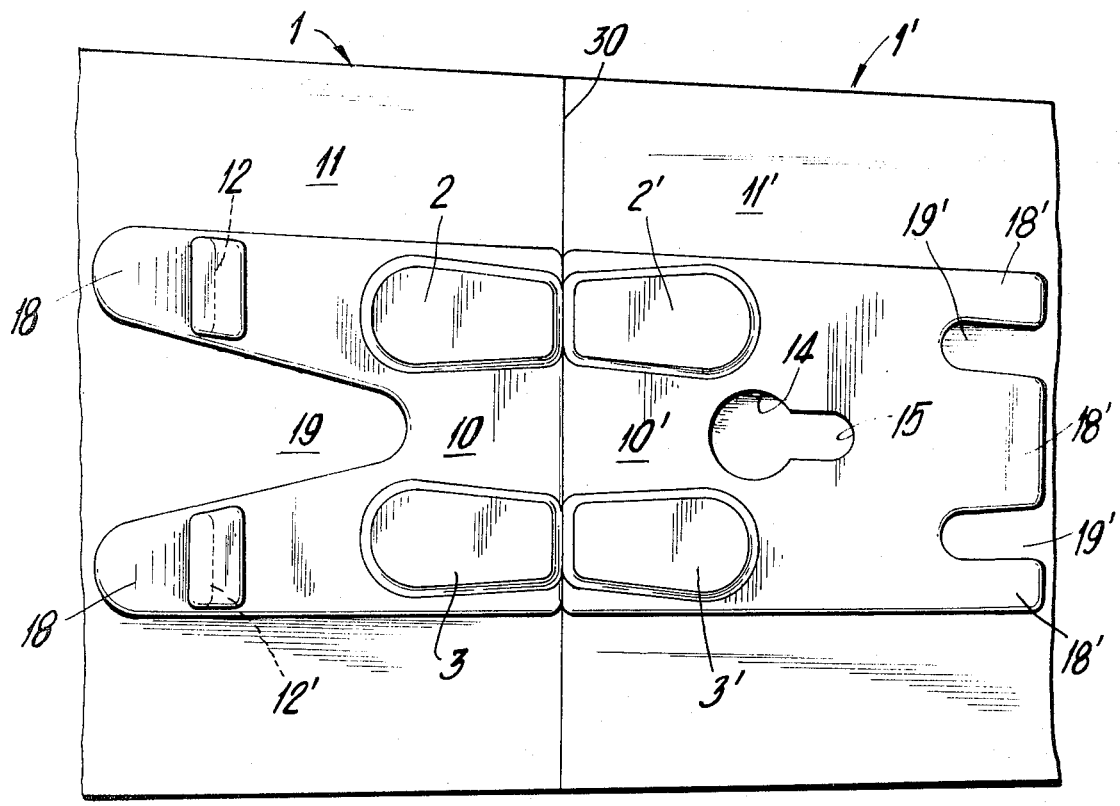
FIG. 1 is a partial side elevational view of a trough section having a trough connecting joint constructed in accordance with the invention.
Figure 2:
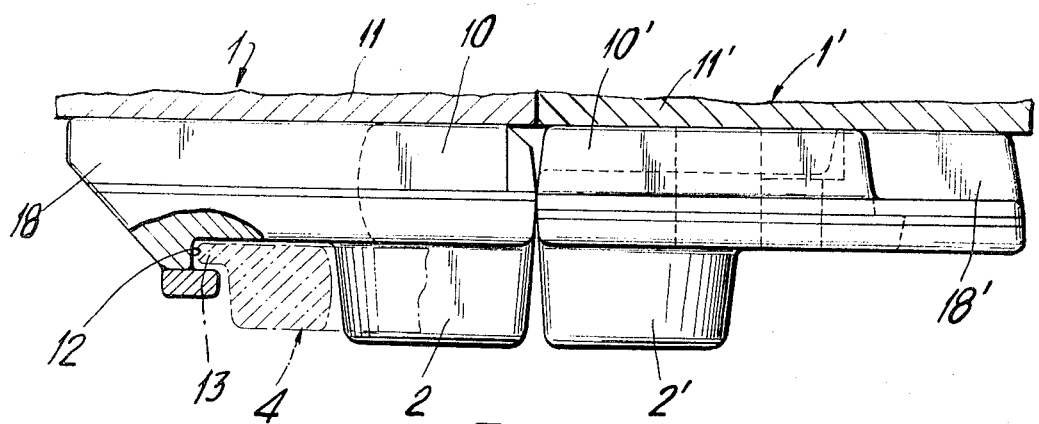
FIG. 2 is a top plan view partly in section of the connecting joint shown in FIG. 1.
Figure 3:
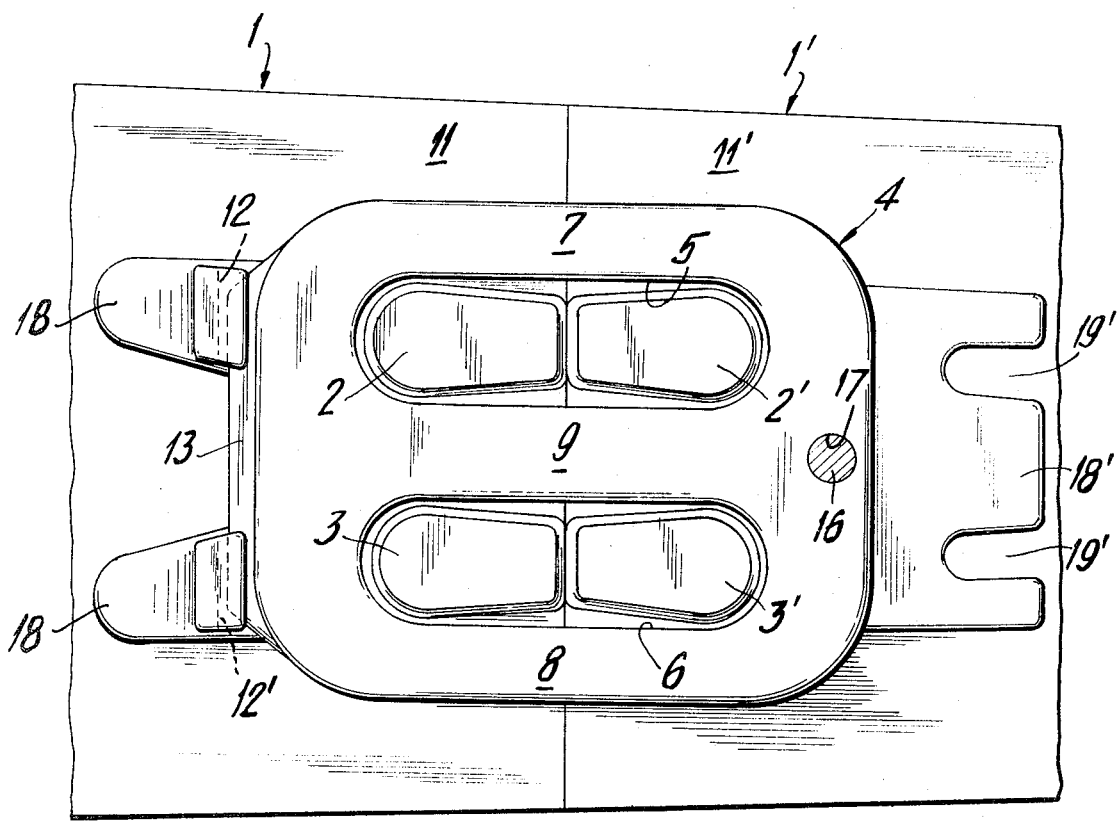
FIG. 3 is a view similar to FIG. 1 with the connecting plate in position.

Referring to the drawings in particular, the invention embodied therein comprises, a conveyor trough which includes two sections 1 and 1' which are partially shown and which advantageously comprise sections of a conveyor trough for chain scraper conveyors and particularly, the sections between the adapter trough and the connecting trough. In accordance with the invention, the trough sections 1 and 1' are joined together by joining means which comprises a pair of vertically spaced apart raised tenons or projections 2 and 3, which are arranged in spaced vertical location on each section 1 and 1' directly adjacent an abutment edge 30. The pairs of tenons 2 and 3 and 2' and 3' of the adjacent sections 1 and 1' are arranged in opposition with each other on each side of the connecting joint 30. A connecting plate 4, having double eye openings 5 and 6, embrace the respective opposed pairs of tenons 2,2' and 3,3'. As shown in FIG. 3, the connecting plate 4 includes an upper web 7 and a lower web 8 which embrace the exterior side faces of the respective opposed tenons 2,2' and 3, 3'. A center web 9 extends between the two pairs of tenons 2,2' and 3,3'.

The tenons 2 and 3 of the section 1 have cross-sections which taper both in the longitudinal and the transverse directions toward the associated tenons 2' and 3' of the section 1'.

In the embodiment shown, the pairs of tenons 2 and 3 and 2' and 3' form a unit with the trough connecting part 10 and 10', respectively. The trough connecting part 10 is inserted into the trough side walls 11 and the trough section 1 is provided with insert pockets 12, 12' which are designed to receive an engagement tongue 13 carried on the connecting plate 4. The section 1' is provided with a bore 14 with an adjourning oblong slot 15 to receive a fastening bolt 16, such as a screw bolt, which passes through a corresponding bore 17 of the connecting plate 4. In the embodiment shown, the connecting part 10 includes vertically spaced extensions 18 on each side of a recessed area 19, whereas, the connecting part 10' of the section 1' includes three spaced projections 18' with the intermediate recess areas 19'. The extensions 18 and 18' are provided to form a bracket holder adjacent the tenons 2 and 3 and 2' and 3', respectively.

While a specific embodiment of the invention has been shown and described in detail to illustrate the application of the principles of the invention, it will be understood that the invention may be embodied otherwise without departing from such principles.

What is claimed is:

1. A trough joint for trough sections of a conveyor trough for chain scraper conveyors, particularly for joining the adapter trough or machine frame and the connecting trough, comprising two trough sections arranged in end-to-end abutment, and joining means associated with said sections for holding said sections together including a pair of spaced apart raised tenons carried by each of said sections with the corresponding tenons of one section being aligned and opposed to the corresponding tenons of the other section, and a connecting plate having double eye openings embracing said pairs of tenons of adjacent trough sections with the opposed tenons of adjacent sections being positioned in respective ones of said eye openings, said tenons being surrounded by an upper and a lower web portion of said plate, said plate having a central web extending between said eye openings.

2. A trough joint, according to claim 1, wherein said tenons have a cross-section tapering both in longitudinal and transverse directions toward the associated tenons of the adjacent trough section.

3. A trough joint, according to claim 1, wherein said pairs of tenons of each trough section include a trough connecting part, said sections having side walls carrying said trough connecting part.

4. A trough joint, according to claim 3, wherein said trough connecting parts of adjacent trough sections have a wall forming a pocket, said connecting plate having a tongue engaged in said pocket, the opposite side of said connecting plate having a bore and a fastening bolt extending through said connecting plate bore and threaded into said connecting part.

* * * * *